United States Patent
Takada et al.

(10) Patent No.: US 7,226,700 B2
(45) Date of Patent: Jun. 5, 2007

(54) ANODE AND BATTERY USING THE SAME

(75) Inventors: Tomoo Takada, Kanagawa (JP);
Kenichi Kawase, Kanagawa (JP);
Yukio Miyaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 167 days.

(21) Appl. No.: 10/745,156

(22) Filed: Dec. 23, 2003

(65) Prior Publication Data

US 2004/0166409 A1   Aug. 26, 2004

(30) Foreign Application Priority Data

Dec. 26, 2002   (JP) .......................... P2002-376571

(51) Int. Cl.
*H01M 4/38* (2006.01)
(52) U.S. Cl. ...................... 429/244; 429/233
(58) Field of Classification Search .............. 429/208, 429/211, 233, 243, 237, 241, 242, 218.1, 429/244
See application file for complete search history.

(56) References Cited

U.S. PATENT DOCUMENTS 6,723,468 B2 * 4/2004 Lebouchard et al. ........ 429/161
2003/0180619 A1 * 9/2003 Tamura et al. ......... 429/231.95

* cited by examiner

*Primary Examiner*—Patrick Joseph Ryan
*Assistant Examiner*—Monique M. WIlls
(74) *Attorney, Agent, or Firm*—Sonnenschein Nath & Rosenthal LLP

(57) ABSTRACT

Provided is a battery capable of improving cycle characteristics without increasing the thickness of an anode current collector. An anode active material layer including at least one kind selected from the group consisting of Sn and compounds thereof is formed on an anode current collector having a projection on a substrate through a vapor deposition method, a liquid-phase deposition method or a sintering method, and the anode current collector and the anode active material layer are alloyed with each other in at least a portion of an interface therebetween. By a function of the projection, the anode current collector can be prevented from being cracked into small pieces due to expansion and shrinkage of the anode active material layer. Further, a stress on the anode active material layer due to the expansion and the shrinkage can be spread out so that cracks produced in the anode active material layer can be scattered in various directions to reduce the size of the cracks.

12 Claims, 4 Drawing Sheets

ANODE AND BATTERY USING THE SAME

RELATED APPLICATION DATA

The present application claims priority to Japanese Application(s) No(s). P2002-376571 filed Dec. 26, 2002, which application(s) is/are incorporated herein by reference to the extent permitted by law.

BACKGROUND OF THE INVENTION

1. Field of the Invention

The present invention relates to an anode comprising an anode current collector and an anode active material layer, and a battery using the anode.

2. Description of the Related Art

In recent years, as mobile devices have higher performance and more functions, secondary batteries with higher capacity used as power sources of the mobile devices have been desired. As a secondary battery which meets the requirement, there is a lithium secondary battery. However, in a now-typical lithium secondary battery using lithium cobalt oxide as a cathode and graphite as an anode, its battery capacity is in a saturation state, so it is extremely difficult to significantly increase the capacity. Therefore, it has been considered since a long time ago that lithium (Li) metal is used for an anode, but in order to put the anode to practical use, it is required to improve precipitation/dissolution efficiency of lithium and control dendrite deposition.

On the other hand, recently, an anode with higher capacity which uses silicon (Si), tin (Sn) or the like has been studied actively. However, due to expansion and shrinkage of an anode active material which occur when charge and discharge are repeated, the anode active material is cracked into small pieces, thereby the anode has extremely poor cycle characteristics such as a decline in current collecting performance, and promotion of the decomposition of an electrolyte solution due to an increased surface area. Therefore, an anode which includes an anode active material layer formed on an anode current collector through a vapor deposition method, a liquid-phase deposition method or a sintering method has been studied (refer to, for example, Japanese Unexamined Patent Application Publication No. Hei 8-50922, Japanese Patent No. 2948205 and Japanese Unexamined Patent Application Publication No. Hei 11-135115). According to the anode, compared to a conventional coating type anode formed through coating with slurry including an anode active material in a particle shape, a binder and so on, the anode can be prevented from being cracked into small pieces, and an anode current collector and an anode active material layer can be formed as a unit, so electronic conductivity in the anode becomes very good, and in terms of capacity and cycle life, the anode is expected to have higher performance. Moreover, a conducive material, a binder, a gap and so on conventionally included in the anode can be reduced or eliminated, so the anode can be formed into a thin film in essence.

However, even in the anode, due to intense expansion and shrinkage of the anode active material upon charge and discharge, the anode active material layer is cracked into small pieces, and a decline in current collecting performance, and promotion of the decomposition of the electrolyte due to an increased area surface occur, thereby resulting in a loss in the capacity. Therefore, the cycle characteristics in the anode are not sufficient enough. Moreover, due to intense expansion and shrinkage of the anode active material layer, linear and large cracks are produced in the anode active material layer, thereby when the strength of the anode current collector is not sufficient, a fracture is produced in part of the anode current collector, so sufficient cycle characteristics cannot be obtained accordingly. In order to secure the strength of the anode current collector, the anode current collector is required to have a larger thickness, but in terms of higher capacity, the anode current collector preferably has a smaller thickness.

SUMMARY OF THE INVENTION

In view of the foregoing, it is an object of the invention to provide an anode capable of improving cycle characteristics without increasing the thickness of an anode current collector, and a battery using the anode.

An anode according to the invention comprises: an anode current collector having a projection on a substrate; and an anode active material layer including at least one kind selected from the group consisting of tin and compounds thereof, and being formed on the anode current collector, and being alloyed with the anode current collector in at least a portion of an interface with the anode current collector.

A battery according to the invention comprises: a cathode; an anode; and an electrolyte, wherein the anode comprises: an anode current collector having a projection on a substrate; and an anode active material layer including at least one kind selected from the group consisting of tin and compounds thereof, and being formed on the anode current collector, and being alloyed with the anode current collector in at least a portion of an interface with the anode current collector.

In the anode according to the invention, the anode current collector having a projection on the substrate is used, so a stress applied to the anode active material layer due to expansion and shrinkage upon charge and discharge can be spread out, thereby cracks produced in the anode active material layer can be scattered in various directions to reduce the size of the cracks. Therefore, a stress on the anode current collector is spread out to prevent a fracture from being produced in the anode current collector.

In the battery according to the invention, the anode according to the invention is used, so damage to the anode can be prevented, thereby cycle characteristics can be improved.

Other and further objects, features and advantages of the invention will appear more fully from the following description.

DETAILED DESCRIPTION OF THE PREFERRED EMBODIMENTS

Preferred embodiments of the present invention will be described in more detail below referring to the accompanying drawings.

An anode according to an embodiment of the invention is formed through the following steps. An anode active material layer is formed on one side or both sides of an anode current collector having a projection on a substrate, and then the anode current collector and the anode active material layer are alloyed in at least a portion of an interface therebetween. More specifically, in the interface, an element of the anode current collector is dispersed into the anode active material layer, or an element of the anode active material layer is dispersed into the anode current collector, or they are dispersed into each other. In the description, the above-described dispersion of the element is considered as a mode of alloying.

Figure 1:
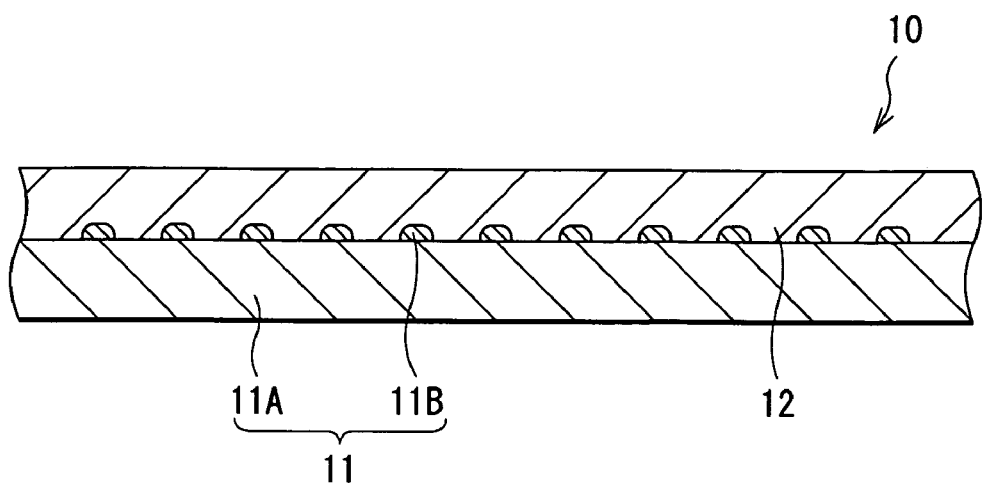
FIG. 1 is a sectional view of an anode according to an embodiment of the invention in the state where an anode current collector and an anode active material layer are not alloyed yet.

FIG. 1 shows the structure of an anode 10 according to an embodiment of the invention in the state where the anode current collector 11 and the anode active material layer 12 are not alloyed yet. A substrate 11A is preferably made of a material with a certain degree of strength and high conductivity, and preferably includes, for example, at least one kind selected from the group consisting of copper (Cu), nickel (Ni), cobalt (Co), manganese (Mn), titanium (Ti), molybdenum (Mo), aluminum (Al) and stainless. There may be cases where the substrate 11A is preferably made of metal which is easily alloyed with the anode active material layer 12 among them. In the embodiment, as will be described later, the anode active material layer 12 includes at least one kind selected from the group consisting of tin and compounds thereof, so as the material of the substrate 11A, copper, nickel, cobalt, manganese, titanium or stainless is suitable. The substrate 11A may have a single layer or a plurality of layers. In the case where the substrate 11A has a plurality of layers, a layer in contact with the anode active material layer 12 may be made of a metal material which is easily alloyed with the anode active material layer 12, and the other layers may be made of any other metal material.

The surface roughness of the substrate 11A, more specifically the arithmetic mean roughness Ra defined by JIS B 0601 is preferably within a range of 0.1 µm to 20 µm, and more preferably within a range of 0.5 µm to 10 µm. In the anode 10, expansion and shrinkage of the anode active material layer 12 upon charge and discharge exert a large influence on the anode current collector 11, but when the surface roughness of the substrate 11A is within the above-described range, the anode current collector 11 and the anode active material layer 12 are more firmly joined in the interface therebetween, so the anode active material layer 12 can be prevented from peeling off from the anode current collector 11.

A projection 11B promotes alloying between the anode current collector 11 and the anode active material layer 12, and scatters cracks, which are produced in the anode active material layer 12 upon charge and discharge, in various direction so as to reduce the size of the cracks. The projection 11B is preferably made of at least one kind selected from the group consisting of copper, iron, nickel, cobalt, manganese, titanium, molybdenum and compounds thereof, which resists being alloyed with lithium (Li), and is easily alloyed with tin. It is because the projection 11B can further promote alloying. More specifically, in terms of conductivity, the projection 11B preferably includes at least one kind selected from the group consisting of copper and compounds thereof. Moreover, the projection 11B preferably includes at least one kind selected from the group consisting of aluminum, zinc (Zn), silver (Ag), gold (Au), germanium (Ge), indium (In) and compounds thereof, which is easily alloyed with lithium in addition to the material which resist being alloyed with lithium and are easily alloyed with tin. It is because a tin-based alloy can be stabilized.

In this case, the projection 11B including a material which resists being alloyed with lithium and is easily alloyed with tin, and a material which is easily alloyed with lithium may be used, or a first projection including a material which resists being alloyed with lithium and is easily alloyed with tin and a second projection including a material which is easily alloyed with lithium may be used. In the former case, for example, the projection 11B may include an alloy of the material which resists being alloyed with lithium and is easily alloyed with tin and the material which is easily alloyed with lithium, or a layer including the material which resists being alloyed with lithium and is easily alloyed with tin and a layer including the material which is easily alloyed with lithium.

The projection 11B may have any shape such as a spherical shape, a square shape or a shape in which projections with these shapes are stacked, but the projection 11B preferably has an average diameter ranging from 0.5 µm to 20 µm. When the average diameter is too small, it is difficult to promote alloying between the anode current collector 11 and the anode active material layer 12, and further it is difficult to scatter cracks produced in the anode active material layer 12 in various direction, so a stress is applied to the anode current collector 11, thereby a fracture is easily produced. On the other hand, when the average diameter is too large, adhesion properties between the anode current collector 11 and the anode active material layer 12 tends to decline.

The anode active material layer 12 includes at least one kind selected from the group consisting of tin and compounds thereof as an anode active material. Tin and compounds thereof can be alloyed with lithium or the like, and have a large capacity of inserting and extracting lithium, so depending upon combination, compared to a conventionally used graphite, the energy density of the anode 10 can be increased. Examples of the compounds include an alloy including tin and an element selected from elements of Groups 4 through 11 in the long form of the periodic table of the elements, $Mg_2Sn$, $SnO_w$ ($0<w\leq2$), $SnSiO_3$ and $LiSnO$.

The anode active material layer 12 is preferably formed through at least one kind selected from the group consisting of a vapor deposition method, a liquid-phase deposition method and a sintering method, because damage due to expansion and shrinkage of the anode active material layer 12 upon charge and discharge can be prevented, and the anode current collector 11 and the anode active material layer 12 can be formed as one unit, and further electronic conductivity in the anode 10 can be improved. Moreover, unlike a conventional coating type anode, a binder, a gap and so on can be reduced or eliminated, so the anode 10 can be formed into a thin film.

The anode 10 can be manufactured through the following steps, for example.

At first, for example, as the substrate 11A, metal foil or the like with a single layer or a plurality of layers is prepared, and then the projection 11B in a particle shape is formed on the substrate 11A through, for example, the vapor deposition method or the liquid-phase deposition method so as to form the anode current collector 11. Alternatively, through the sintering method in which after the substrate 11A is coated with powder including metal particles, the powder is sintered, the projection 11B in a particle shape may be formed on the substrate 11A to form the anode current collector 11. The metal particles may have not only a spherical shape but also a rock shape, a block shape or any other shape. Further, after the projection 11B is formed through any of these methods, heat treatment may be additionally carried out in a vacuum atmosphere or a nonoxidizing atmosphere so as to further alloy an interface between the substrate 11A and the projection 11B.

After the anode current collector 11 is formed, through the vapor deposition method or the liquid-phase deposition method, an anode active material, more specifically at least one kind selected from the group consisting of tin and compounds thereof is deposited on the anode current collector 11 so as to form the anode active material layer 12. Moreover, after a precursor layer including an anode active material in a particle shape is formed on the anode current collector 11, the anode active material layer 12 may be formed through sintering the precursor layer, or the anode active material layer 12 may be formed through a combination of two or three kinds of the vapor deposition method, the liquid-phase deposition method and the sintering method. Thus, when the anode active material layer 12 is formed through at least one kind selected from the group consisting of the vapor deposition method, the liquid-phase deposition method and the sintering method, the anode active material layer 12 which is alloyed with the anode current collector 11 in at least a portion of the interface with the anode current collector 11 may be formed. Further, in order to further alloy the interface between the anode current collector 11 and the anode active material layer 12, heat treatment may be additionally carried out in a vacuum atmosphere or a nonoxidizing atmosphere. Specifically, in the case where the anode active material layer 12 is formed with plating which will be described later, the anode active material layer 12 may resist being alloyed in the interface with the anode current collector 11, so the heat treatment is preferably carried out if necessary. Moreover, when the anode active material layer 12 is formed through the vapor deposition method, there may be cases where properties can be improved by further alloying the interface between the anode current collector 11 and the anode active material layer 12, so the heat treatment is preferably carried out if necessary.

As the vapor deposition method, for example, a physical deposition method or a chemical deposition method can be used, and more specifically, a vacuum deposition method, a sputtering method, an ion plating method, a laser ablation method, a thermal CVD (chemical vapor deposition) method, a plasma CVD method or the like can be used. As the liquid-phase deposition method, a known technique such as electrolytic plating or electroless plating can be used. As the sintering method, a known technique such as, for example, an atmosphere sintering method, a reaction sintering method or a hot press sintering method can be used.

The anode 10 can be used in the following secondary battery, for example.

Figure 2:
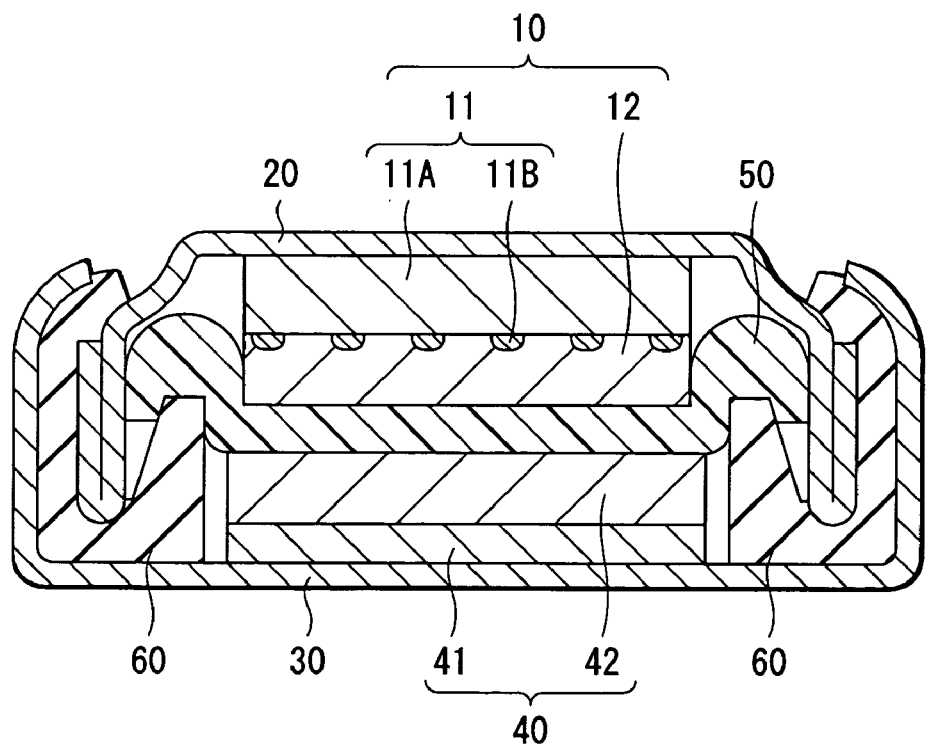
FIG. 2 is a sectional view of a secondary battery using the anode shown in FIG. 1.

FIG. 2 shows the structure of the secondary battery. In FIG. 2, the anode 10 in which an anode current collector 11 and an anode active material layer 12 are not alloyed yet is shown. The secondary battery is a so-called coin type battery, and comprises a laminate including the above-described anode 10 contained in a package cup 20 and a cathode 40 contained in a package can 30 with a separator 50 in between. Edge portions of the package cup 20 and the package can 30 are caulked by an insulative gasket 60 to seal them. The package cup 20 and the package can 30 are made of, for example, metal such as stainless or aluminum (Al).

The cathode 40 includes, for example, a cathode current collector 41 and a cathode active material layer 42 disposed on the cathode current collector 41. The cathode current collector 41 is made of, for example, aluminum, nickel, stainless or the like.

The cathode active material layer 42 includes, for example, one kind or two or more kinds selected from cathode materials capable of inserting and extracting lithium as cathode active materials, and the cathode active material layer 42 may include an conducive material such as a carbon material and a binder such as polyvinylidene fluoride if necessary. As the cathode material capable of inserting and extracting lithium, for example, lithium-containing metal composite oxide represented by a general formula $Li_xMIO_2$ is preferable. The lithium-containing metal composite oxide can generate a high voltage, and has a high density, so the secondary battery can have a higher capacity. In the general formula, MI represents one or more kinds of transition metal, and for example, at least either cobalt or nickel is preferable. In the general formula, the value of x depends upon charge-discharge conditions of the battery, and is generally within a range of $0.05 \leq x \leq 1.10$. Specific examples of such lithium-containing metal composite oxide include $LiCoO_2$, $LiNiO_2$ and the like.

The cathode 40 can be formed through the following steps, for example. At first, the cathode active material, the conducive material and the binder are mixed to form a mixture, and then a dispersion medium such as N-methyl pyrrolidone is added to the mixture to form cathode mixture slurry. Next, after the cathode mixture slurry is applied to the cathode current collector 41 made of metal foil, and is dried, the cathode active material layer 42 is formed through compression molding to form the cathode 40.

The separator 50 isolates between the anode 10 and the cathode 40 so as to pass lithium ions through while preventing a short circuit of a current due to the contact between the anode 10 and the cathode 40. The separator 50 is made of, for example, polyethylene or polypropylene.

The separator 50 is impregnated with an electrolyte solution which is a liquid electrolyte. The electrolyte solution includes, for example, a solvent and a lithium salt as an electrolyte salt which is dissolved in the solvent, and the electrode solution may include an additive if necessary. Examples of the solvent include organic solvents such as ethylene carbonate, propylene carbonate, dimethyl carbonate, diethyl carbonate and ethyl methyl carbonate, and one kind or a mixture including two or more kinds selected from them may be used.

Examples of the lithium salt include $LiPF_6$ and $LiClO_4$, and one kind or a mixture including two or more kinds selected from them may be used.

For example, a laminate including the anode 10, the separator 50 impregnated with the electrolyte solution, and the cathode 40 is contained in the package cup 20 and the package can 30, and then the package cup 20 and the package can 30 are caulked to form the secondary battery.

When the secondary battery is charged, lithium ions are extracted from the cathode 40, and inserted into the anode 10 through the electrolyte solution. On the other hand, when the secondary battery is discharged, for example, lithium ions are extracted from the anode 10, and inserted into the cathode 40 through the electrolyte solution. The anode active material layer 12 expands or shrinks during charge and discharge. However, the anode current collector 11 and the anode active material layer 12 are strongly alloyed by the function of the projection 11B, so the anode active material layer 12 can be prevented from being cracked into small pieces. Moreover, a stress on the anode active material layer 12 due to expansion and shrinkage is spread out, so cracks produced in the anode active material layer 12 are scattered in various directions so as to reduce the size of the cracks. In other words, unlike a conventional anode having no projection, linear and large cracks are not produced in the anode active material layer 12, so a stress on the anode current collector 11 is spread out, thereby a fracture in the anode current collector 11 can be prevented.

Moreover, the anode 10 according to the embodiment may be used in the following secondary battery.

Figure 3:
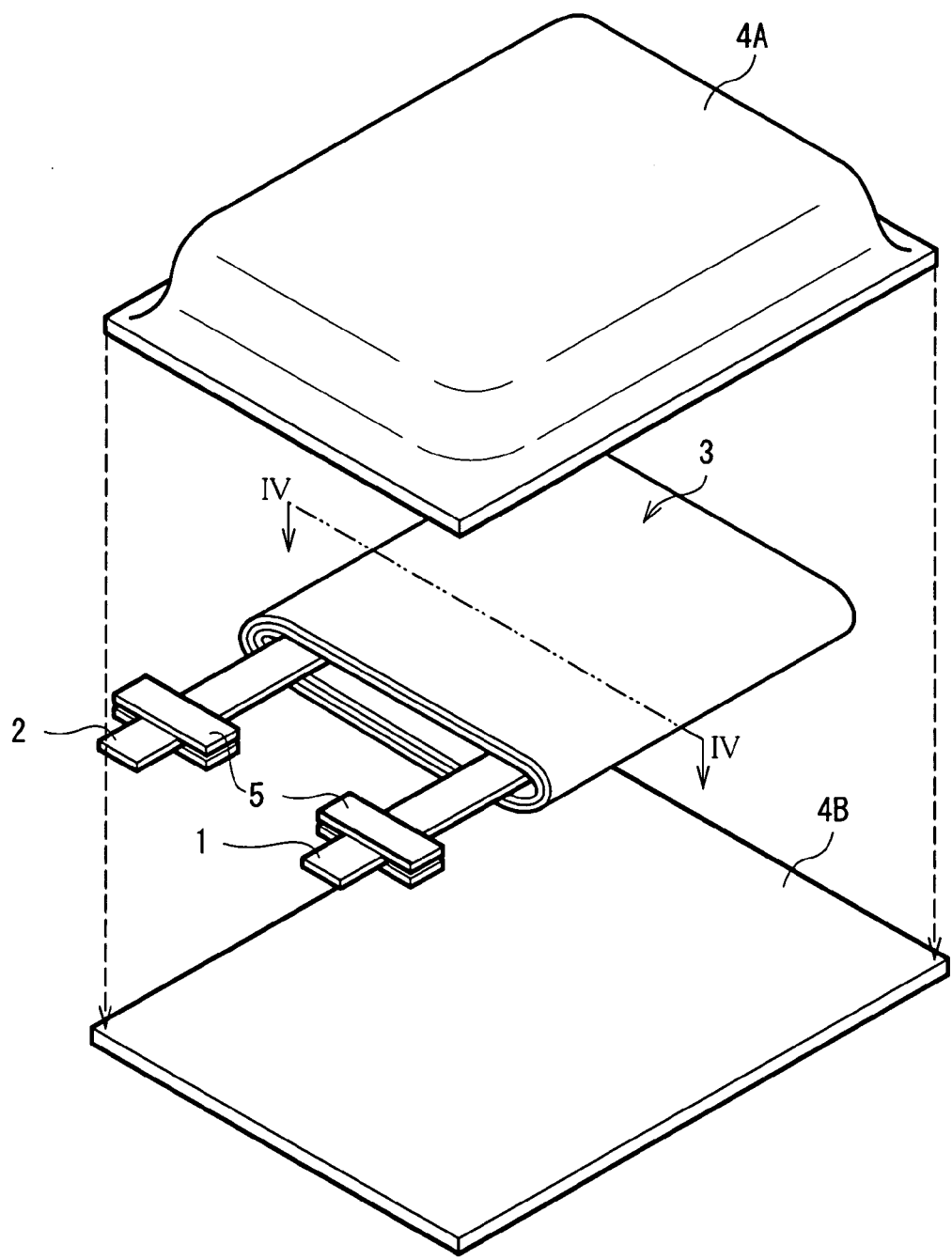
FIG. 3 is an exploded perspective view of another secondary battery using the anode shown in FIG. 1.

FIG. 3 shows the structure of the secondary battery. In the secondary battery, a spirally wound electrode body 3 to which an anode lead 1 and a cathode lead 2 are attached is contained in film-shaped package parts 4A and 4B, thereby the size, the weight and the thickness of the secondary battery can be reduced.

The anode lead 1 and the cathode lead 2 are laid from the interiors of the package parts 4A and 4B to outside, for example, in the same direction. The anode lead 1 and the cathode lead 2 are made of, for example, a metal material such as aluminum, copper, nickel or stainless, and are formed into a sheet shape or a mesh shape.

The package parts 4A and 4B are made of a rectangular aluminum laminated film including, for example, a nylon film, aluminum foil and a polyethylene film which are stuck together in this order. The package parts 4A and 4B are disposed so that a polyethylene film side of the package parts 4A and 4B face the spirally wound electrode body 3, and edge portions of the package parts 4A and 4B are put together by fusion bonding or with an adhesive. A contact film 5 for preventing the entry of outside air is inserted each between the package part 4A and the anode lead 1, the package part 4A and the cathode lead 2, the package part 4B and the anode lead 1, and the package part 4B and the cathode lead 2. The contact film 5 is made of a material with adhesion properties to the anode lead 1 and the cathode lead 2, for example, a polyolefin resin such as polyethylene, polypropylene, modified polyethylene or modified polypropylene.

Alternatively, the package parts 4A and 4B may be made of a laminated film with another structure, a high molecular weight film such as polypropylene, or a metal film instead of the above aluminum laminated film.

Figure 4:
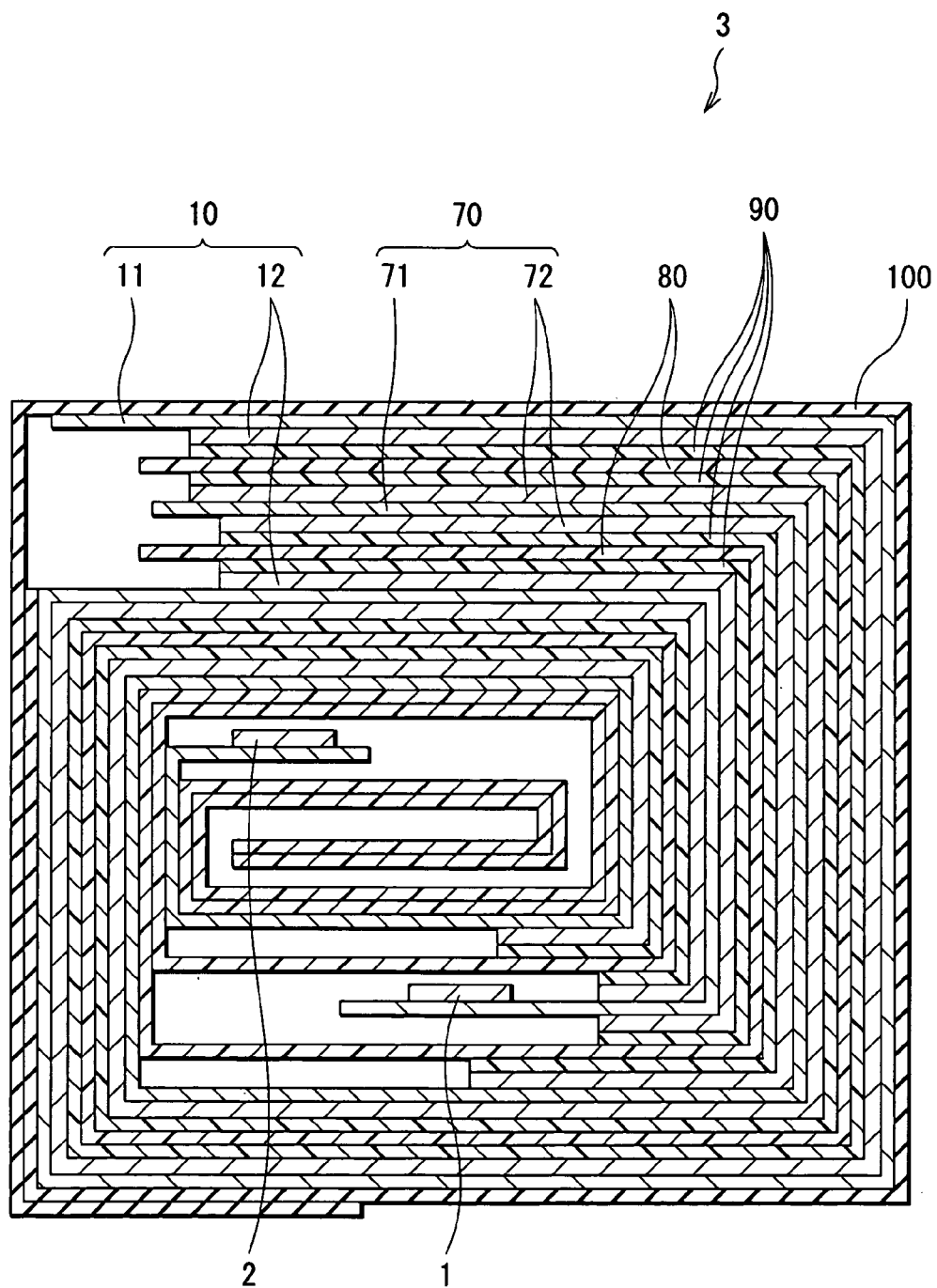
FIG. 4 is a sectional view of a spirally wound electrode body taken along a line IV—IV in FIG. 3.

FIG. 4 shows a sectional view of the spirally wound electrode body 3 taken along a line IV—IV in FIG. 3. The spirally wound electrode body 3 is formed through spirally winding a laminate including the above anode 10 and a cathode 70 with a separator 80 and an electrolyte layer 90 in between. The outermost portion of the spirally wound electrode body 3 is protected with a protective tape 100. For the sake of convenience, the anode 10 is simplified in FIG. 4.

The anode 10 has a structure in which the anode active material layer 12 is disposed on one side or both sides of the anode current collector 11, and the cathode 70 has a structure in which a cathode active material layer 72 is disposed on one side or both sides of a cathode current collector 71. The structures of the cathode current collector 71, the cathode active material layer 72 and the separator 80 are equivalent to those of the cathode current collector 41, the cathode active material layer 42 and the separator 50, respectively.

The electrolyte layer 90 is made of a so-called gel electrolyte in which a retaining body retains an electrolyte solution. The gel electrolyte is preferable because leakage of the battery or swelling of the battery due to high temperature can be prevented. The components of the electrolyte solution (that is, a solvent and an electrolyte salt) are equivalent to those in the coin type secondary battery shown in FIG. 2.

The retaining body is made of, for example, a high molecular weight material. As the high molecular weight material, for example, polyvinylidene fluoride which is a block copolymer is used.

The secondary battery can be manufactured through the following steps, for example.

At first, on the anode 10 and the cathode 70 each, the electrolyte layer 90 in which the retaining body retains the electrolyte solution is formed. After that, the anode lead 1 and the cathode lead 2 are welded to an end portion of the anode current collector 11 and an end portion of the cathode current collector 71, respectively.

Next, the anode 10 with the electrolyte layer 90 formed thereon and the cathode 70 with the electrolyte layer 90 formed thereon are laminated with the separator 80 in between to form a laminate, and then the laminate is spirally wound in a longitudinal direction, and the protective tape 100 is bonded to an outermost portion of the laminate, thereby the spirally wound electrode body 3 is formed.

Finally, for example, the spirally wound electrode body 3 is sandwiched between the package parts 4A and 4B, and then the edge portions of the package parts 4A and 4B are put together by heat fusion welding or the like, thereby the spirally wound electrode body 3 is enclosed in the package parts 4A and 4B. At this time, the contact film 5 is inserted each between the anode lead 1 and the package part 4A, the anode lead 1 and the package part 4B, the cathode lead 2 and the package part 4A, and the cathode lead 2 and the package part 4B. Thereby, the secondary battery shown in FIGS. 3 and 4 is completed.

Actions of the secondary battery are the same as those of the coin type secondary battery shown in FIG. 2.

Thus, in the embodiment, the anode current collector 11 having the projection 11B on the substrate 11A is included, so alloying between the anode current collector 11 and the anode active material layer 12 can be promoted. Thereby, the anode active material layer 12 can be prevented from being cracked into small pieces due to expansion and shrinkage of the anode active material layer 12 upon charge and discharge. Moreover, cracks produced in the anode active material layer 12 due to expansion and shrinkage upon charge and discharge can be scattered in various directions so as to reduce the size of the cracks, thereby a stress on the anode current collector 11 can be spread out so as to prevent a fracture from being produced in the anode current collector 11. Therefore, cycle characteristics can be improved without increasing the thickness of the anode current collector 11.

More specifically, when the projection 11B has an average diameter ranging from 0.5 μm to 20 μm or when the surface roughness of the substrate 11A is 0.1 μm to 20 μm as arithmetic mean roughness, higher effects can be obtained.

EXAMPLES

Next, specific examples of the invention will be described in detail below referring to FIGS. 1 through 4.

Examples 1-1 through 1-3

At first, after the projection 11B made of copper was formed on the substrate 11A made of copper foil with an arithmetic mean roughness Ra of 0.5 μm and a thickness of 15 μm by an electrolytic deposition method, the anode current collector 11 was formed through heat treatment at 500° C. for 1 hour in a vacuum atmosphere. When the average diameter of the projection 11B in the anode current collector 11 of each of Examples 1-1 through 1-3 was actually measured with a SEM (scanning electron microscope), it was 2 μm. Next, the anode active material layer 12 made of tin was formed on the anode current collector 11 to form the anode 10. At that time, in Example 1-1, after a layer made of tin with a thickness of 2 μm was formed through resistance heating vacuum deposition, heat treatment was carried out at 200° C. for 10 hours in a vacuum atmosphere to form the anode active material layer 12. In Example 1-2, the anode active material layer 12 was formed through the following steps. At first, N-methyl pyrrolidone was added to a mixture of powder including tin particles with an average particle diameter of 1 μm and polyvinylidene fluoride at a mass ratio of 90:10 to produce anode mixture slurry. Next, the anode mixture slurry was applied to the anode current collector 11, and then heat treatment was carried out at 90° C. to remove N-methyl pyrrolidone. After that, the anode mixture slurry was sintered in a vacuum atmosphere at 200° C. for 10 hours to form the anode active material layer 12. In Example 1-3, the anode active material layer 12 was formed as in the case of Example 1-2, except that a layer made of tin with a thickness of 2 μm was formed through electrolytic plating. When the obtained anode 10 of each of Examples 1-1 through 1-3 was analyzed by XPS (X-ray photoelectron spectroscopy), AES (Auger electron spectroscopy), EDX (energy dispersive X-Ray spectroscope) and a TEM (transmission electron microscope), it was confirmed that the anode active material layer 12 was alloyed with the anode current collector 11 in at least a portion of the interface with the anode current collector 11.

Next, the secondary battery shown in FIG. 2 was formed using the anode 10 of each of Examples 1-1 through 1-3. The cathode 40 was formed through the following steps. A mixture including lithium cobalt oxide (LiCoO$_2$) powder with an average particle diameter of 5 μm as the cathode active material, carbon black as a conductive material and polyvinylidene fluoride as a binder at a mass ratio of 92:3:5 was added to N-methyl pyrrolidone as a dispersion medium to form cathode mixture slurry. Then, the cathode mixture slurry was applied to the cathode current collector 41 made of aluminum with a thickness of 30 μm, and was dried, and then pressure was applied to the cathode mixture slurry to form the cathode active material layer 42. Thereby, the cathode 40 was formed. The used electrolyte solution was formed through dissolving LiPF$_6$ as the lithium salt in a mixed solvent of 40 wt % of ethylene carbonate and 60 wt % of diethyl carbonate so that the concentration of LiPF$_6$ in the solvent was 1.0 mol/dm$^3$. As the separator 50, a polypropylene film with a thickness of 25 μm was used.

As Comparative Examples 1-1 through 1-3 relative to Examples 1-1 through 1-3, anodes were formed as in the case of Examples 1-1 through 1-3, except that the same substrate as that in Examples 1-1 through 1-3 was used as the anode current collector. Moreover, as Comparative Examples 1-4 and 1-5 relative to Examples 1-1 through 1-3, anodes were formed through coating the anode current collector with the anode active material layer. At that time, the anode active material layer was formed through the following steps. At first, a mixture including 70 parts by mass of powder including tin particles with an average particle diameter of 1 μm as an anode active material, 20 parts by mass of artificial flake graphite as a conductive material, and 5 parts by mass of polyvinylidene fluoride as a binder was prepared, and N-methyl pyrrolidone was mixed with the mixture to form anode mixture slurry. Next, the anode mixture slurry was applied to the anode current collector, and dried, then pressure was applied to the anode mixture slurry to form the anode active material layer. In Comparative Example 1-4, the same substrate as that in Examples 1-1 through 1-3 was used as the anode current collector, and in Comparative Example 1-5, the same anode current collector as that in Examples 1-1 through 1-3 was used. Next, secondary batteries were formed as in the case of Examples 1-1 through 1-3 using the anodes of Comparative Examples 1-1 through 1-5.

A charge-discharge test was carried out on each of the secondary batteries of Examples 1-1 through 1-3 and Comparative Examples 1-1 through 1-5 at 25° C. to determine the capacity retention ratio after 20 cycles. At that time, charge was carried out at a constant current density of 1 mA/cm$^2$ until the battery voltage reached 4.2 V, then charge was carried out at a constant voltage of 4.2 V until the current density reached 0.03 mA/cm$^2$. On the other hand, discharge was carried out at a constant current density of 1 mA/cm$^2$ until the battery voltage reached 2.5 V. When charge was carried out, based upon the charge-discharge capacities of the anode 10 and the cathode 40 previously determined by actual measurement and calculation, the utilization factor of the anode in the first charge was set to be 90% to prevent deposition of lithium metal. The capacity retention ratio after 20 cycles was determined as a ratio of the discharge capacity in the 20th cycle to the discharge capacity in the first cycle, that is, (discharge capacity in the 20th cycle)/(discharge capacity in the first cycle)×100. The obtained results are shown in Table 1.

TABLE 1

| | ANODE CURRENT COLLECTOR | | | | | METHOD OF FORMING | |
| --- | --- | --- | --- | --- | --- | --- | --- |
| | SUBSTRATE | | | PROJECTION | | ANODE ACTIVE | CAPACITY RETENTION |
| | MATERIAL | Ra (μm) | MATERIAL | AVERAGE DIAMETER (μm) | FORMING METHOD | MATERIAL LAYER | RATIO (%) |
| EXAMPLE 1-1 | Cu | 0.5 | Cu | 2 | ELECTROLYTIC DEPOSITION | VACUUM DEPOSITION | 87 |
| EXAMPLE 1-2 | Cu | 0.5 | Cu | 2 | ELECTROLYTIC DEPOSITION | SINTERING | 83 |
| EXAMPLE 1-3 | Cu | 0.5 | Cu | 2 | ELECTROLYTIC DEPOSITION | PLATING | 86 |

TABLE 1-continued

| | ANODE CURRENT COLLECTOR | | | | | METHOD OF FORMING | |
|---|---|---|---|---|---|---|---|
| | SUBSTRATE | | | PROJECTION | | ANODE | CAPACITY |
| | | | | AVERAGE | | ACTIVE | RETENTION |
| | MATERIAL | Ra (μm) | MATERIAL | DIAMETER (μm) | FORMING METHOD | MATERIAL LAYER | RATIO (%) |
| COMPARATIVE EXAMPLE 1-1 | Cu | 0.5 | — | 0 | — | VACUUM DEPOSITION | 45 |
| COMPARATIVE EXAMPLE 1-2 | Cu | 0.5 | — | 0 | — | SINTERING | 40 |
| COMPARATIVE EXAPMLE 1-3 | Cu | 0.5 | — | 0 | — | PLATING | 44 |
| COMPARATIVE EXAMPLE 1-4 | Cu | 0.5 | — | 0 | — | COATING | 23 |
| COMPARATIVE EXAMPLE 1-5 | Cu | 0.5 | Cu | 2 | ELECTROLYTIC DEPOSITION | COATING | 21 |

It was obvious from Table 1 that the secondary batteries of Examples 1-1 through 1-3 in which the projection 11B made of copper which resisted being alloyed with lithium was formed on the substrate 11A could obtain a higher capacity retention ratio than the secondary batteries of Comparative Examples 1-1 through 1-3 in which no projection was formed. On the other hand, in Comparative Examples 1-3 and 1-4 in which the anode active material layer was formed through coating, the secondary battery of Comparative Example 1-3 in which no projection was formed could obtain a higher capacity retention ratio than that of Comparative Example 1-4 in which the projection was formed. In other words, it was found out that in the case where the anode active material layer 12 was formed through the vapor deposition method, the sintering method or the liquid-phase deposition method, when the anode current collector 11 with the projection 11B made of a material, which resisted being alloyed with lithium, formed on the substrate 11A was used, cycle characteristics could be improved.

Figure 5:
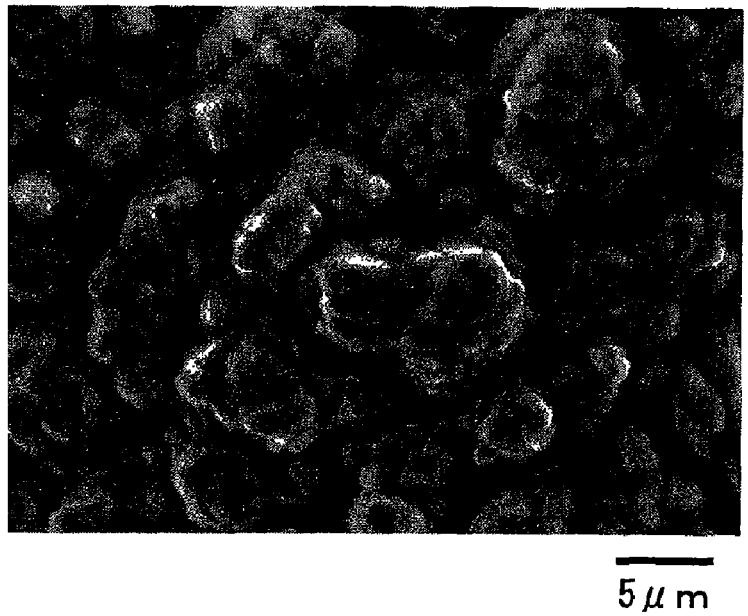
FIG. 5 is a SEM photo of an anode according to Example 1-1 of the invention.
Figure 6:
FIG. 6 is a SEM photo of an anode according to Comparative Example 1-1.

Moreover, the secondary batteries of Examples 1-1 through 1-3 and Comparative Examples 1-1 through 1-3 were disassembled after the first cycle of charge and discharge to observe the above-described conditions to observe the anode 10 by a SEM (scanning electron microscope). As a result, in Comparative Example 1-1, linear and large cracks were produced in the anode active material layer, and thereby a fracture was produced in the anode current collector. On the other hand, in Examples 1-1 through 1-3, cracks produced in the anode active material layer 12 was scattered in various directions to reduce the size of the cracks, so no fracture was produced in the anode current collector 11. In other words, it was considered that the difference was a factor of the difference in the capacity retention ration between Examples 1-1 through 1-3 and Comparative Examples 1-1 through 1-3. As representative examples, the result of Example 1-1 is shown in FIG. 5, and the result of Comparative Example 1-1 is shown in FIG. 6.

Examples 2-1 through 2-6

The anode 10 was formed as in the case of Example 1-1, except that as the substrate 11A, copper foil with an arithmetic mean roughness Ra shown in Table 2 and a thickness of 15 μm was used. The average diameter of the projection 11B in the anode current collector 11 of each of Examples 2-1 through 2-6 was 2 μm by actual measurement with the SEM.

When the anode 10 of each of Examples 2-1 through 2-6 was analyzed by the XPS, the AES, the EDX and the TEM as in the case of Example 1-1, it was confirmed that the anode active material layer 12 was alloyed with the anode current collector 11 in at least a portion of the interface with the anode current collector 11. Next, the secondary battery was formed using the anode 10 of each of Examples 2-1 through 2-6 as in the case of Example 1-1. A charge-discharge test was carried out on the secondary batteries of Examples 2-1 through 2-6 as in the case of Example 1-1 to determine the capacity retention ratio after 20 cycles. The results are shown in Table 2.

TABLE 2

| | ANODE CURRENT COLLECTOR | | | | | METHOD OF FORMING | |
|---|---|---|---|---|---|---|---|
| | SUBSTRATE | | | PROJECTION | | ANODE | CAPACITY |
| | | | | AVERAGE | | ACTIVE | RETENTION |
| | MATERIAL | Ra (μm) | MATERIAL | DIAMETER (μm) | FORMING METHOD | MATERIAL LAYER | RATIO (%) |
| EXAMPLE 2-1 | Cu | 0.05 | Cu | 2 | ELECTROLYTIC DEPOSITION | VACUUM DEPOSITION | 75 |

TABLE 2-continued

| | ANODE CURRENT COLLECTOR | | | | METHOD OF FORMING | |
|---|---|---|---|---|---|---|
| | SUBSTRATE | | | PROJECTION | ANODE ACTIVE MATERIAL LAYER | CAPACITY RETENTION RATIO (%) |
| | MATERIAL | Ra (μm) | MATERIAL | AVERAGE DIAMETER (μm) | FORMING METHOD | |
| EXAMPLE 2-2 | Cu | 0.1 | Cu | 2 | ELECTROLYTIC DEPOSITION | VACUUM DEPOSITION | 81 |
| EXAMPLE 1-1 | Cu | 0.5 | Cu | 2 | ELECTROLYTIC DEPOSITION | VACUUM DEPOSITION | 87 |
| EXAMPLE 2-3 | Cu | 1 | Cu | 2 | ELECTROLYTIC DEPOSITION | VACUUM DEPOSITION | 90 |
| EXAMPLE 2-4 | Cu | 10 | Cu | 2 | ELECTROLYTIC DEPOSITION | VACUUM DEPOSITION | 85 |
| EXAPMLE 2-5 | Cu | 20 | Cu | 2 | ELECTROLYTIC DEPOSITION | VACUUM DEPOSITION | 79 |
| EXAMPLE 2-6 | Cu | 30 | Cu | 2 | ELECTROLYTIC DEPOSITION | VACUUM DEPOSITION | 67 |

It was obvious from Table 2 that there was a tendency that as the arithmetic mean roughness Ra of the substrate 11A increased, the capacity retention ratio increased to the maximum value, then decreased. In other words, it was found out that in order to further improve the cycle characteristics, the arithmetic mean roughness Ra was preferably within a range of 0.1 μm to 20 μm.

Examples 3-1 through 3-7

The anode 10 was formed as in the case of Example 1-1, except that the anode current collector 11 was formed through the following steps. After anode mixture slurry including powder including copper particles, polyvinylidene fluoride and N-methyl pyrrolidone was applied to the substrate 11A made of the same copper foil as that in Example 1-1, and dried, pressure was applied to the slurry, and the slurry was sintered in an argon (Ar) atmosphere so as to form the anode current collector 11. When the average diameter of the projection 11B in the anode current collector 11 of each of Examples 3-1 through 3-7 was actually measured with the SEM, it was substantially the same as the average particle diameter of used copper particles. The average diameter of the projection 11B of each of Examples 3-1 through 3-7 is shown in Table 3. Moreover, when the anode 10 of each of Examples 3-1 through 3-7 was analyzed by the XPS, the AES, the EDX and the TEM as in the case of Example 1-1, it was confirmed that the anode active material layer 12 was alloyed with the anode current collector 11 in at least a portion of the interface with the anode current collector 11. Next, the secondary battery was formed using the anode 10 of each of Examples 3-1 through 3-7 as in the case of Example 1-1. A charge-discharge test was carried out on the secondary batteries of Examples 3-1 through 3-7 as in the case of Example 1-1 to determine the capacity retention ratio after 20 cycles. The results are shown in Table 3 together with the results of Comparative Example 1-1.

TABLE 3

| | ANODE CURRENT COLLECTOR | | | | METHOD OF FORMING | |
|---|---|---|---|---|---|---|
| | SUBSTRATE | | | PROJECTION | ANODE ACTIVE MATERIAL LAYER | CAPACITY RETENTION RATIO (%) |
| | MATERIAL | Ra (μm) | MATERIAL | AVERAGE DIAMETER (μm) | FORMING METHOD | |
| EXAMPLE 3-1 | Cu | 0.5 | Cu | 0.1 | SINTERING | VACUUM DEPOSITION | 46 |
| EXAMPLE 3-2 | Cu | 0.5 | Cu | 0.5 | SINTERING | VACUUM DEPOSITION | 66 |
| EXAMPLE 3-3 | Cu | 0.5 | Cu | 2 | SINTERING | VACUUM DEPOSITION | 85 |
| EXAMPLE 3-4 | Cu | 0.5 | Cu | 5 | SINTERING | VACUUM DEPOSITION | 88 |
| EXAMPLE 3-5 | Cu | 0.5 | Cu | 10 | SINTERING | VACUUM DEPOSITION | 81 |
| EXAPMLE 3-6 | Cu | 0.5 | Cu | 20 | SINTERING | VACUUM DEPOSITION | 73 |
| EXAMPLE 3-7 | Cu | 0.5 | Cu | 30 | SINTERING | VACUUM DEPOSITION | 65 |

TABLE 3-continued

| | ANODE CURRENT COLLECTOR | | | | METHOD OF FORMING | |
|---|---|---|---|---|---|---|
| | SUBSTRATE | | | PROJECTION | ANODE ACTIVE | CAPACITY RETENTION |
| | MATERIAL | Ra (μm) | MATERIAL | AVERAGE DIAMETER (μm) | FORMING METHOD | MATERIAL LAYER | RATIO (%) |
| COMPARATIVE EXAMPLE 1-1 | Cu | 0.5 | — | 0 | — | VACUUM DEPOSITION | 45 |

It was obvious from Table 3 that in Examples 3-1 through 3-7, a higher capacity retention ratio than that in Comparative Example 1-1 could be obtained. Moreover, it was obvious from the results of Example 3-1 through 3-7 that there was a tendency that as the average diameter of the projection 11B increased, the capacity retention ratio increased to the maximum value, then decreased. In other words, it was found out that in order to further improve the cycle characteristics, the average diameter of the projection 11B was preferably within a range of 0.5 μm to 20 μm.

Example 4

The anode 10 was formed as in the case of Example 1-1, except that the substrate 11A made of cobalt foil with an arithmetic mean roughness Ra of 0.1 μm and a thickness of 15 μm was used. The average diameter of the projection 11B in the anode current collector 11 of Example 4 was 2 μm by actual measurement with the SEM. When the anode 10 of Example 4 was analyzed by the XPS, the AES, the EDX and the TEM as in the case of Example 1-1, it was confirmed that the anode active material layer 12 was alloyed with the anode current collector 11 in at least a portion of the interface with the anode current collector 11. As Comparative Example 4 relative to Example 4, an anode was formed as in the case of Example 4, except that the same substrate as that in Example 4 was used as the anode current collector. Next, the secondary battery was formed using the anode 10 of each of Example 4 and Comparative Example 4. A charge-discharge test was carried out on the secondary batteries of Example 4 and Comparative Example 4 as in the case of Example 1-1 to determine the capacity retention ration after 20 cycles. The results are shown in Table 4.

could be obtained as in the case of Example 1-1. In other words, even if materials of the substrate 11A and the projection 11B were different from each other, cycle characteristics could be improved.

Examples 5-1 and 5-2

The anode 10 was formed as in the case of Example 1-1, except that the anode current collector 11 was formed through the following steps. At first, powder including nickel-copper (Ni—Cu) alloy particles with an average particle diameter of 10 μm formed through a gas atomization method and mechanical pulverization or cobalt-indium (Co—In) alloy particles with an average particle diameter of 2 μm formed through a mechanical alloying method, polyvinylidene fluoride and N-methyl pyrrolidone were mixed to form anode mixture slurry. Next, after the anode mixture slurry was applied to the substrate 11A made of the same copper foil as that in Example 1-1, and dried, pressure was applied to the anode mixture slurry. Then, the anode mixture slurry was sintered in an argon atmosphere to form the anode current collector 11. The mass ratio between nickel and copper in the nickel-copper alloy particles was 4:1, and the mass ratio between cobalt and indium in the cobalt-indium alloy particles was 1:4. When the average diameter of the projection 11B in the anode current collector 11 of each of Examples 5-1 and 5-2 was actually measured with the SEM, it was the same as the average particle diameter of the nickel-copper alloy particles or the cobalt-indium alloy, that is, 10 μm or 2 μm. When the anode 10 of each of Examples 5-1 and 5-2 was analyzed by the XPS, the AES, the EDX and the TEM as in the case of Example 1-1, it was confirmed that the anode active material layer 12 was alloyed with the

TABLE 4

| | ANODE CURRENT COLLECTOR | | | | METHOD OF FORMING | |
|---|---|---|---|---|---|---|---|
| | SUBSTRATE | | | PROJECTION | ANODE ACTIVE | CAPACITY RETENTION |
| | MATERIAL | Ra (μm) | MATERIAL | AVERAGE DIAMETER (μm) | FORMING METHOD | MATERIAL LAYER | RATIO (%) |
| EXAMPLE 4 | Co | 0.1 | Cu | 2 | ELECTROLYTIC DEPOSITION | VACUUM DEPOSITION | 81 |
| COMPARATIVE EXAMPLE 4 | Co | 0.1 | — | 0 | — | VACUUM DEPOSITION | 40 |

It was obvious from Table 4 that in Example 4, a higher capacity retention ratio than that in Comparative Example 4 anode current collector 11 in at least a portion of the interface with the anode current collector 11. The secondary battery was formed using the anode 10 of each of Examples 5-1 and 5-2 as in the case of Example 1-1. A charge-discharge test was carried out on the secondary batteries of Examples 5-1 and 5-2 as in the case of Example 1-1 to determine the capacity retention ratio after 20 cycles. The results are shown in Table 5 together with the results of Comparative Example 1-1.

indium particles, polyvinylidene fluoride and N-methyl pyrrolidone were mixed to form anode mixture slurry. Next, after the anode mixture slurry was applied to the anode current collector formed in Examples 1-1 and 1-2, and was dried, pressure was applied to the anode mixture slurry. Then, the anode mixture slurry was sintered in an argon (Ar) atmosphere to form the anode current collector 11. When the

TABLE 5

| | ANODE CURRENT COLLECTOR | | | | METHOD OF FORMING | | |
|---|---|---|---|---|---|---|---|
| | SUBSTRATE | | PROJECTION | | | ANODE ACTIVE | CAPACITY RETENTION |
| | MATERIAL | Ra (μm) | MATERIAL | AVERAGE DIAMETER (μm) | FORMING METHOD | MATERIAL LAYER | RATIO (%) |
| EXAMPLE 5-1 | Cu | 0.5 | Ni—Cu | 10 | SINTERING | VACUUM DEPOSITION | 80 |
| EXAMPLE 5-2 | Cu | 0.5 | Co—In | 2 | SINTERING | VACUUM DEPOSITION | 85 |
| COMPARATIVE EXAMPLE 1-1 | Cu | 0.5 | — | 0 | — | VACUUM DEPOSITION | 45 |

It was obvious from Table 5 that in Examples 5-1 and 5-2, a higher capacity retention ratio than that in Comparative Example 1-1 could be obtained, and in Example 5-2 in which the projection 11B including cobalt which resisted being alloyed with lithium and was easily alloyed with tin and indium which was easily alloyed with lithium, a higher capacity retention ratio could be obtained, compared to Example 5-2 in which the projection 11B included nickel and copper both of which resisted being alloyed with lithium and were easily alloyed with tin. In other words, it was found out that even if the projection 11B was made of an alloy, the cycle characteristics could be improved, and specifically when the projection 11B included a material which resisted being alloyed with lithium and was easily alloyed with tin, and a material which was easily alloyed with lithium, higher effects could be obtained.

Examples 6-1 through 6-7

The anode 10 was formed as in the case of Example 1-1, except that the anode current collector 11 was formed through the following steps. At first, powder including anode current collector 11 of each of Examples 6-1 through 6-7 was analyzed with the SEM, a first projection made of copper and a second projection made of indium were observed, and the average diameters of the first projection and the second projection were the same as the average particle diameters of used copper particles and used indium particles, respectively. The average diameter of the projection 11B of each of Examples 6-1 through 6-7 is shown in Table 6. When the anode 10 of each of Examples 6-1 through 6-7 was analyzed by the XPS, AES, the EDX and the TEM as in the case of Example 1-1, it was confirmed that the anode active material layer 12 was alloyed with the anode current collector 11 in at least a portion of the interface with the anode current collector 11. Next, the secondary battery was formed using the anode 10 of each of Examples 6-1 through 6-7 as in the case of Example 1-1. A charge-discharge test was carried out on the secondary batteries of Examples 6-1 through 6-7 as in the case of Example 1-1 to determine the capacity retention ratio after 20 cycles. The results are shown in Table 6 together with the results of Example 1-1 and Comparative Example 1-1.

TABLE 6

| | ANODE CURRENT COLLECTOR | | | | | | | |
|---|---|---|---|---|---|---|---|---|
| | | | PROJECTION | | | | METHOD OF FORMING | |
| | | | Cu | | | In | | |
| | SUBSTRATE | | AVERAGE PARTICLE DIAMETER | FORMING | | AVERAGE PARTICLE DIAMETER | FORMING | ANODE ACTIVE MATERIAL | CAPACITY RETENTION RATIO |
| | MATERIAL | Ra (μm) | (μm) | METHOD | | (μm) | METHOD | LAYER | (%) |
| EXAMPLE 1-1 | Cu | 0.5 | 2 | ELECTROLYTIC DEPOSITION | | 0 | — | VACUUM DEPOSITION | 87 |
| EXAMPLE 6-1 | Cu | 0.5 | 2 | ELECTROLYTIC DEPOSITION | | 0.1 | SINTERING | VACUUM DEPOSITION | 88 |
| EXAMPLE 6-2 | Cu | 0.5 | 2 | ELECTROLYTIC DEPOSITION | | 0.5 | SINTERING | VACUUM DEPOSITION | 90 |

TABLE 6-continued

| | ANODE CURRENT COLLECTOR | | | | | | METHOD OF FORMING ANODE ACTIVE MATERIAL LAYER | CAPACITY RETENTION RATIO (%) |
|---|---|---|---|---|---|---|---|---|
| | SUBSTRATE | | PROJECTION | | | | | |
| | | | Cu | | In | | | |
| | MATERIAL | Ra (μm) | AVERAGE PARTICLE DIAMETER (μm) | FORMING METHOD | AVERAGE PARTICLE DIAMETER (μm) | FORMING METHOD | | |
| EXAMPLE 6-3 | Cu | 0.5 | 2 | ELECTROLYTIC DEPOSITION | 2 | SINTERING | VACUUM DEPOSITION | 92 |
| EXAPMLE 6-4 | Cu | 0.5 | 2 | ELECTROLYTIC DEPOSITION | 5 | SINTERING | VACUUM DEPOSITION | 89 |
| EXAMPLE 6-5 | Cu | 0.5 | 2 | ELECTROLYTIC DEPOSITION | 10 | SINTERING | VACUUM DEPOSITION | 79 |
| EXAMPLE 6-6 | Cu | 0.5 | 2 | ELECTROLYTIC DEPOSITION | 20 | SINTERING | VACUUM DEPOSITION | 61 |
| EXAMPLE 6-7 | Cu | 0.5 | 2 | ELECTROLYTIC DEPOSITION | 30 | SINTERING | VACUUM DEPOSITION | 54 |
| COMPARATIVE EXAMPLE 1-1 | Cu | 0.5 | 0 | — | 0 | — | VACUUM DEPOSITION | 45 |

It was obvious from Table 6 that in Examples 6-1 through 6-7, a higher capacity retention ratio than that in Comparative Example 1-1 could be obtained. Moreover, it was obvious from the results of Examples 6-1 through 6-7 that as in the case of Examples 3-1 through 3-7, there was a tendency that as the average diameter of the projection 11B increased, the capacity retention ratio increased to the maximum value, then decreased. In other words, it was found out that even if the first projection made of a material which resisted being alloyed with lithium and was easily alloyed with tin and the second projection made of a material which was easily alloyed with lithium were included, the same result as in the case where only the projection 11B made of a material which resisted being alloyed with lithium and was easily alloyed with tin was included could be obtained.

Examples 7-1 and 7-2

At first, as in the case of Examples 1-1 through 1-3, the anode 10 was formed. Next, a secondary battery shown in FIGS. 3 and 4 was formed using the anode 10 of each of Examples 7-1 and 7-2. The cathode 70 was formed as in the case of the cathode 40. In Example 7-1, the electrolyte layer 90 was formed through the following steps. At first, a mixture including 10 wt % of polyvinylidene fluoride which was a block copolymer with a weight-average molecular weight of 600,000 as a retaining body and 60 wt % of dimethyl carbonate was dissolved in 30 wt % of an electrolyte solution including 42.5 wt % of ethylene carbonate, 42.5 wt % of propylene carbonate, and 15 wt % of LiPF$_6$ as a lithium salt to form a precursor solution. Then, the precursor solution was applied to the anode 10 and the cathode 70, and the anode 10 and the cathode 70 was left alone for 8 hours at ambient temperature to volatilize dimethyl carbonate, thereby the electrolyte layer 90 was formed. On the other hand, in Example 7-2, instead of the electrolyte layer 90, an electrolyte solution including 42.5 wt % of ethylene carbonate, 42.5 wt % of propylene carbonate and 15 wt % of LiPF$_6$ as a lithium salt was used. A charge-discharge test was carried out on the secondary batteries of Examples 7-1 and 7-2 as in the case of Example 1-1 to determine the capacity retention ratio after 20 cycles. The results are shown in Table 7.

TABLE 7

| | ANODE CURRENT COLLECTOR | | | | | METHOD OF FORMING ANODE ACTIVE MATERIAL LAYER | ELECTROLYTE | CAPACITY RETENTION RATIO (%) |
|---|---|---|---|---|---|---|---|---|
| | SUBSTRATE | | PROJECTION | | | | | |
| | MATERIAL | Ra (μm) | MATERIAL | AVERAGE DIAMETER (μm) | FORMING METHOD | | | |
| EXAMPLE 7-1 | Cu | 0.5 | Cu | 2 | ELECTROLYTIC DEPOSITION | VACUUM DEPOSITION | WITH RETAINING BODY | 93 |
| EXAMPLE 7-2 | Cu | 0.5 | Cu | 2 | ELECTROLYTIC DEPOSITION | VACUUM DEPOSITION | WITHOUT RETAINING BODY | 89 |

It was obvious from Table 7 that in Example 7-1 in which the retaining body was used in the electrolyte, a higher capacity retention ratio than that in Example 7-2 in which the retaining body was not used could be obtained. In other words, it was found out that in the case where the anode current collector having the projection 11B on the substrate 11A was used, when the electrolyte including the retaining body was used, the cycle characteristics could be further improved.

Although in the above examples, the materials of the substrate 11A and the projection 11B are described referring to specific examples, even if other materials are used, the same results can be obtained. Moreover, even if the anode active material layer 12 is formed through any vapor deposition method except for resistance heating vacuum deposition, any other sintering method, or any liquid-phase deposition method except for plating, the same effects can be obtained.

The present invention is described referring to the embodiments and the examples, but the invention is not limited to the embodiments and the examples, and is variously modified. For example, in the embodiments and the examples, the electrolyte solution which is a liquid electrolyte, or the so-called gel electrolyte is used, but any other electrolyte may be used. Examples of the other electrolyte include a solid electrolyte having ionic conductivity, a mixture of the solid electrolyte and the electrolyte solution, or a mixture of the solid electrolyte and the gel electrolyte.

As the solid electrolyte, for example, a solid high molecular weight electrolyte in which an electrolyte salt is dispersed in a high molecular weight compound having ionic conductivity, or an inorganic solid electrolyte made of ion conducting glass, ionic crystal or the like can be used. In this case, as the high molecular weight compound, for example, an ether-based high molecular weight compound such as polyethylene oxide or a cross-link including polyethylene oxide, a ester-based high molecular weight compound such as polymethacrylate, an acrylate-based high molecular weight compound, a mixture thereof, or any of the above high molecular weight compounds copolymerized in molecules can be used. Further, as the inorganic solid electrolyte, lithium nitride, lithium phosphate or the like can be used.

Moreover, in the embodiments and the examples, the anode active material layer 12 is formed on the anode current collector 11, but any other layer may be formed between the anode current collector and the anode active material layer.

Further, in the embodiments and the examples, the coin type secondary battery and the spirally wound laminate type secondary battery are described. However, the invention can be applied to a cylindrical type secondary battery, a prismatic type secondary battery, a button type secondary battery, a thin type secondary battery, a large type secondary battery and a multilayer laminate type secondary battery in a like manner, and the invention can be applied to not only secondary batteries but also primary batteries.

As described above, in the anode according to the invention or the a battery according to the invention, the anode active material layer including at least one kind selected from the group consisting of tin and compounds thereof is formed on the anode current collector having the projection on the substrate so that the anode current collector and the anode active material layer are alloyed with each other in at least a portion of an interface therebetween, so alloying between the anode current collector and the anode active material layer can be promoted. Thereby, the anode active material can be prevented from being cracked into small pieces upon charge and discharge. Moreover, cracks produced in the anode active material layer due to expansion and shrinkage of the anode active material layer upon charge and discharge can be scattered in various directions to reduce the size of the cracks, thereby a stress on the anode current collector can be spread out to prevent a fracture from being produced in the anode current collector. Therefore, the cycle characteristics can be improved without increasing the thickness of the anode current collector.

More specifically, in the anode according to the invention or the battery according to the invention, the average diameter of the projection is within a range of 0.5 μm to 20 μm, or the surface roughness of the substrate is within a range of 0.1 μm to 20 μm as arithmetic mean roughness, so higher effects can be obtained.

Obviously many modifications and variations of the present invention are possible in the light of the above teachings. It is therefore to be understood that within the scope of the appended claims the invention may be practiced otherwise than as specifically described.

What is claimed is:

1. An anode, comprising:
   an anode current collector having a projection on a substrate; and
   an anode active material layer including at least one kind selected from the group consisting of tin (Sn) and compounds thereof, and being formed on the anode current collector, and being alloyed with the anode current collector in at least a portion of an interface with the anode current collector,
   wherein the projection includes a first projection having at least one kind selected from the group consisting of copper (Cu), iron (Fe), nickel (Ni), cobalt (Co), manganese (Mn), titanium (Ti), molybdenum (Mo) and compounds thereof, and a second projection having at least one kind selected from the group consisting of aluminum (Al), zinc (Zn), silver (Ag), gold (Au), germanium (Ge), indium (In) and compounds thereof.

2. An anode according to claim 1, wherein
   the anode active material is formed through at least one kind selected from the group consisting of a vapor deposition method, a liquid-phase deposition method and a sintering method.

3. An anode according to claim 1 wherein
   the average diameter of the projection is within a range of 0.5 μm to 20 μm.

4. An anode according to claim 1, wherein
   the substrate includes at least one kind selected from the group consisting of copper (Cu), nickel (Ni), cobalt (Co), manganese (Mn), titanium (Ti), molybdenum (Mo), aluminum (Al) and stainless steel.

5. An anode according to claim 1, wherein
   the surface roughness of the substrate is within a range of 0.1 μm to 20 μm as arithmetic mean roughness.

6. A battery, comprising:
   a cathode;
   an anode; and
   an electrolyte,
   wherein the anode comprises:
   an anode current collector having a projection on a substrate; and
   an anode active material layer including at least one kind selected from the group consisting of tin (Sn) and compounds thereof, and being formed on the anode current collector, and being alloyed with the anode current collector in at least a portion of an interface with the anode current collector,
   wherein the projection includes a first projection having at least one kind selected from the group consisting of copper (Cu), iron (Fe), nickel (Ni), cobalt (Co), manganese (Mn), titanium (Ti), molybdenum (Mo) and compounds thereof, and a second projection having at least one kind selected from the group consisting of aluminum (Al), zinc (Zn), silver (Ag), gold (Au), germanium (Ge), indium (In) and compounds thereof.

7. A battery according to claim 6, wherein
the anode active material is formed through at least one kind selected from the group consisting of a vapor deposition method, a liquid-phase deposition method and a sintering method.

8. A battery according to claim 6, wherein
the average diameter of the projection is within a range of 0.5 μtm to 20 μm.

9. A battery according to claim 6, wherein
the substrate includes at least one kind selected from the group consisting of copper (Cu), nickel (Ni), cobalt (Co), manganese (Mn), titanium (Ti), molybdenum (Mo), aluminum (Al) and stainless steel.

10. A battery according to claim 6, wherein
the surface roughness of the substrate is within a range of 0.1 μm to 20 μm as arithmetic mean roughness.

11. A battery according to claim 6, wherein
the electrolyte includes a retaining body, a solvent and an electrolyte salt.

12. A battery according to claim 6, further comprising:
a film-shaped package part for containing the cathode, the anode and the electrolyte therein.

* * * * *